April 22, 1952  E. CHALUPA  2,593,983
SMOKELESS COFFEE ROASTING APPARATUS
Filed Nov. 13, 1950
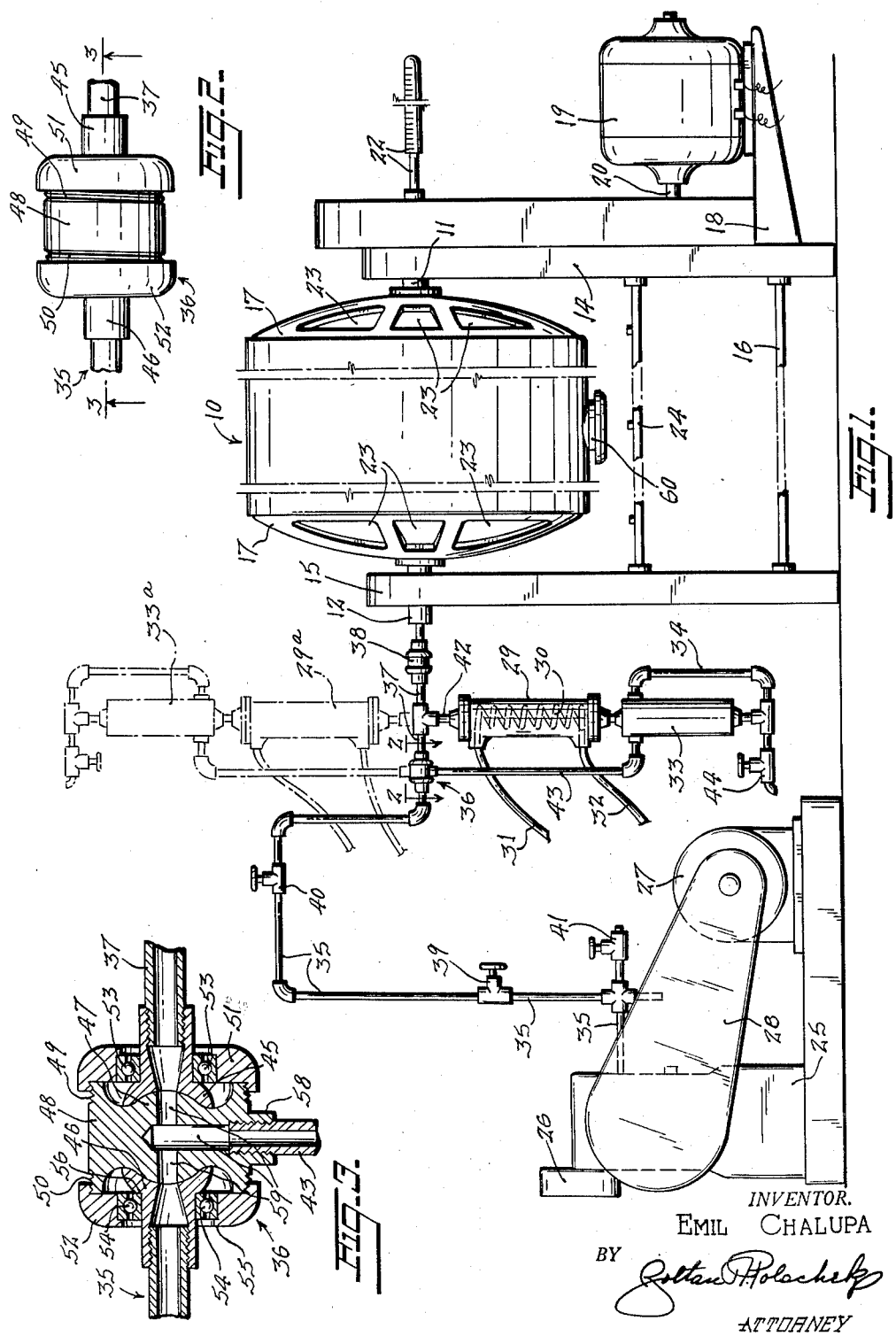
INVENTOR.
EMIL CHALUPA
BY
ATTORNEY Patented Apr. 22, 1952

2,593,983

UNITED STATES PATENT OFFICE 2,593,983

SMOKELESS COFFEE ROASTING APPARATUS

Emil Chalupa, New York, N. Y.

Application November 13, 1950, Serial No. 195,221

4 Claims. (Cl. 99—236)

This invention relates to new and useful improvements in the roasting of coffee; and, more particularly, the aim is to provide a novel and valuable smokeless coffee roasting unit wherein the coffee beans to be roasted are confined in such a way and served by such apparatus that during the roasting operation (preferably in a rotary roasting drum or tumbler, with the roasting heat applied at the exterior of such tumbler, as by way of gas burners or the like) several successive conditions may be established, with each maintained for a length of time appropriate to the circumstances but always finally to obtain a roasted coffee of improved quality yet with a minimum weight loss and a roasted coffee of a kind which in use affords a beverage of improved body, flavor and aroma.

According to the coffee roasting unit of the present invention, means are provided whereby the said tumbler or equivalent may be readily supplied with the desired quantity of the raw coffee beans, and then hermetically sealed; whereby next, and desirably before starting the roasting heat, the air in the tumbler may be exhausted therefrom, also from two auxiliary devices respectively called herein the condenser and the receiver, and also from the various piping connections, joints, etc. which serve to combine in a single closed system a vacuum pump or the like and the tumbler, condenser and receiver; whereby next, as following the establishment of the desired relative vacuum in the unit and during application of the roasting heat to the exterior of the tumbler while rotating, and, further, during maintenance of said relative vacuum in the unit, the volatiles of and moisture in the coffee beans in the tumbler are driven off and guided into the condenser and there condensed and so drained into the receiver; and whereby next, a subdivision of the roasting unit may be swung through 180° about a rotary joint in said closed system, thereby, and without disturbing the physical and operative integrity of said closed system, to dispose the receiver in position such that the condensed volatiles drain back into the tumbler to become absorbed by the roasted beans and so return to said beans in their just previously existing dried, roasted condition.

A further object is to provide a coffee roasting unit wherein each batch handled may be of the magnitude of 4,000 pounds of raw coffee beans, as compared with the maximum capacity, about 650 pounds, of coffee roasters as previously developed.

A further object as hereinabove indicated is to provide a smokeless roaster; and, also, a roaster which may be operated with such minimized if not totally eliminated fire hazard that fire insurance savings are possible, no flues or exhaust motors are required, and there is no necessity for employing the carbon dioxide and other inert gas fire extinguishing systems heretofore deemed essential in connection with large scale or industrial coffee roasting.

Still a further object as also hereinabove indicated, and a very important object, is to hold down weight loss in the coffee, as between its final roasted condition, and its raw condition. In this connection, by the present invention the over-all weight loss is merely of the order of one to two per cent; whereas in previous roasters this loss has ranged from seventeeen to twenty-four per cent.

Yet another object is to provide a roasting unit the operation of which affords an important money saving in regard to the cost of the roasting heat; the roaster of the present invention operating in an ideal manner when the roasting heat is as low as 350 to 400° F., as against the 650° F. roasting heat required for satisfactory operation of prior roasters.

These objects among other are attained by the use of a novel coffee roasting unit of the kind exemplified by the details to be made clear hereinafter; which new roasting unit, having the means hereinabove summarized, may be readily and conveniently operated so as, in roasting any given batch of coffee beans, first to heat them in a relative vacuum of 29–29.5″ pull of mercury, and thereafter to continue the roasting heat while maintaining a positive pressure of 35 pounds p. s. i. This very high pressure, even as such taken alone, is something unknown in the coffee roasting industry.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a now approved embodiment of the roasting unit of the invention.

Fig. 2 is a fragmentary enlarged detail view, as though taken at the plane indicated by the line 2—2 of Fig. 1, showing in top plan a rotary joint of the closed system.

Fig. 3 is a vertical section, taken on the line 3—3 of Fig. 2.

Referring now to the drawings more in detail, the roasting oven is shown as a drum 10 constituting a tumbler mounted for rotation about a horizontal axis by means including a pair of end shafts 11 and 12 suitably journalled in and near the tops of a pair of vertical structures 14 and 15 forming part of a framing including a tie rod 16.

Said shafts 11 and 12, each suitably rigidly set in one of the two ends walls 17 of the tumbler 10, are hollow.

Fixed on a shelf 18 carried by the frame part 14 is an electric motor 19, which, by way of a small pulley on its shaft 20, a large pulley on the shaft 11 and a belt engaging both these pulleys, is indicated as the power means for rotating the tumbler 10 at the desired speed; said pulleys and belt being within a guard 21 and hence not shown.

The reason for making the shaft 11 hollow is for the placement therein for operative insertion into the tumbler 10 of a long stem thermometer 22, which latter is mounted relative to the shaft 11 in such manner that said shaft is thereby at some point along its length made air-tight. By way of the thermometer 22 the temperature within the tumbler 10 may at all times be noted.

Also, each of said end walls 17 of the tumbler 10, which end walls are shown as outwardly rounded, is provided at intervals around the same with panes 23 of Pyrex glass or the like set in place in air-tight relation to the main structure of the tumbler 10, which is made of stainless steel. The panes 23 provide peep windows, for noting the color shade of the coffee beans in the tumbler during the roasting operation.

As the means for applying the roasting heat, a gas burner 24 is shown.

A high pressure vacuum pump is indicated at 25, associated with which is a pressure gage 26; said pump driven by a motor 27, as by way of a suitable transmission not shown within a guard 28.

The aforesaid condenser is illustrated at 29, this comprising a vertically elongate outer air-tight shell having therein a cooling coil 30; water being continually passed through said coil during the roasting operation, as by feed in through a flexible hose 31 and feed out through a flexible hose 32.

The aforesaid receiver is illustrated at 33, this comprising a vertically elongate air-tight shell having a liquid-level sight glass 34.

The aforesaid closed system for maintaining therein as predetermined first a vacuous condition and next a high pressure condition during a roasting operation includes (in addition to the tumbler 10, the condenser 29, the receiver 33, and the short tube shown in Fig. 1 as connecting the bottom of the condenser with the top of the receiver), a conduit portion 35 leading from the pump 25 to a rotary joint 36, and a conduit portion 37 leading from said joint to another rotary joint 38. Within the said conduit portion 35 are a main valve 39 and two vacuum-break valves 40 and 41.

Also included in said closed system is a short pipe connection 42 from the said conduit portion 37 to the top of the condenser 29, and the short pipe connection shown in Fig. 1 as leading from the rotary joint 38 to the hollow shaft 12, thereby to include also in said closed system the said shaft 12 and the interior of the tumbler 10.

Further included in said closed system is a conduit portion 43 leading from the rotary joint 36 to the upper end portion of the receiver 33.

It already having been pointed out that the main structure of the tumbler 10, that is, its main central drum portion and also its hollow shafts 11 and 12, are made of stainless steel, it should further be noted that also made of stainless steel are the rotary joint 38, the condenser 29, the receiver 33 (except for its sight glass 34), and the tubular elements of the closed system joining the shaft 12 and the rotary joint 38, joining said joint and the condenser 29 by way of the pipe connection 42, and joining said condenser and the receiver 33. As will later become fully clear, it is the said pipe connection 42 and the other just referred to tubular elements of said closed system through which the driven off volatiles of and moisture in the coffee beans being roasted are guided during the roasting operation and drained back into the interior of the tumbler at a later stage in the operation whereat the contents of the receiver 33 are to be returned to the tumbler for re-absorption by the coffee beans; and stainless steel is used as herein specified to prevent contamination of the coffee while being processed.

The bottom of the receiver 33 is shown as served by a drain-cock 44; for use at intervals in flushing out the condenser 29 and the receiver.

Referring now especially to Figs. 2 and 3, the rotary joint 36 is shown as an air-tight one of the ground joint type; the same incorporating a pair of like nipples 45 and 46 having larger ends each carrying a half-round ground ball seat for coacting with the central spherical portion 47 of a main part 48. Said main part 48 at the exterior of its outer annular band-like portion has a thread 49, and a thread 50 like the thread 49 but of the opposite hand.

A clamp nut 51 for coaction with the thread 49 is a duplicate of a clamp nut 52 for coaction with the thread 50. When the two clamp nuts are tightened up, the main part 48 at its central spherical portion 47 is held in place in air-tight relation to the spherical seat provided by the two nipples 45 and 46 yet is rotatable in said seat about the center line of the elements 35 and 37 seen in Figs. 2 and 3.

To permit such rotation even with the two clamp nuts 51 and 52 tightened up as much as possible, a pair of like ball bearings 54 are included in the combination. As will be noted in the case of the ball bearing at the left in Fig. 3, the clamp nut 52 has an annular flange 55 inwardly extended to abut the outer edge of the outer race of the ball bearing and the nipple 52 has an annular shoulder 56 to abut the inner edge of the inner race of the ball bearing. A similar clasp on the ball bearing 54 at the right in Fig. 3 is provided by the flange on the clamp nut 51 corresponding to the flange 55 and by a shoulder on the nipple 51 corresponding to the shoulder 56.

Projected downwardly from the main part 48 is a neck extension 58 to which is connected the upper portion of a pipe included in the conduit portion 43; said neck extension surrounding the outer end portion of a T-shaped passageway 59 through the spherical portion 47 of said main part 48.

Thus, whether the condenser 29 and receiver 33 are dependent from the conduit portion 37 of Fig. 1 as therein shown in full lines, or swung through 180° to dispose said condenser as indicated in broken lines at 29ª and said receiver as indicated in broken lines at 33ª, the condenser, the receiver and the conduit portions 43 and 37 are all in unvaried operative relation to the remainder of the closed system.

The rotary joint 38 is of the same construction as described above for the joint 36; except that the joint 38 is non-inclusive of an element corresponding to the neck extension 58, and the main central part of the joint 38 has, instead of a T-shaped passageway therethrough corresponding to the passageway 59, merely a straight-line passageway for connecting up the portions of the joint corresponding to the nipples 45 and 46.

At 60 in Fig. 1 is indicated a removable cover for effecting an air-tight closure of an opening in the side wall of the tumbler 10; such opening for admitting a batch of raw coffee beans for roasting, and for discharging said batch after the roasting process is completed.

*Operation*

(1) With said side-wall opening of the tumbler 10 uppermost, and with the cover 60 removed, the raw coffee beans are placed in the tumbler and the cover 60 is replaced and tightened.

(2) The vacuum pump 25 is started up, drawing air out of the entirety of the closed system, until the gage 26 indicates a 29″ pull of mercury; whereupon operation of the pump is halted.

(3) The burner 24 is started up, to commence application of the roasting heat, and the motor 19 is energized to initiate rotation of the tumbler 10; water circulation through the flexible hose 31, the condenser coil 30 and the flexible hose 32 meanwhile having been started.

While the coffee is roasting, the moisture in and the volatiles of the coffee beans are driven therefrom and escape into the condenser 29, there to become condensed.

The volatiles are distilled in the condenser, and pass on to the receiver 33.

The condenser and receiver are of stainless steel as already stated, or of an equivalent harmless material so far as non-contamination of the coffee is concerned, such, for example, as Pyrex glass.

No relief or safety valves of any kind are required, because the condenser and receiver will withstand the predetermined pressures, which run to 35 pounds p. s. i.; it being understood that whereas the air in the closed system is under negative pressure at the beginning of the operation, as already explained, gradually thereafter, due to the heating of the contents of the closed system, the pressure becomes positive and rises to said value of 35 pounds.

(4) When the coffee beans are roasted, the condenser 29 and receiver 33 are manually turned through 180°, to position these parts as indicated at 29ª and 33ª in Fig. 1, and the volatiles then drained back through the condenser and thence into the tumbler 10, the rotation of which latter is continued for a sufficient length of time to insure that the volatiles have all drained back, a fact which may be readily checked by a glance at the sight-glass 34.

The inclusion of the two rotary joints 36 and 38, at the places specified, and with each constructed as already described, permits rearrangement of the parts 29, 30 and 43 as shown in broken lines, without disturbing the air-tight condition of the closed system, during a roasting operation or a series of such operations, each on a new batch of raw coffee beans, repeated one after another.

(5) After a suitable period of rotation of the tumbler 10 prolonged sufficiently to cause full re-absorption of the returned volatiles by and substantially uniformly as between the coffee beans, the cover 60 is removed and the tumbler 10 is fractionally rotated to bring its side-wall supply and discharge opening at a low enough point to spill the roasted coffee into a suitable collecting receptacle or the like not shown.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A smokeless coffee roasting unit, comprising a roasting drum rotatively mounted having a coffee beans admission and discharge opening, a cover for closing said opening, said mounting means including a hollow shaft the interior of which opens into the interior of said drum, an air-tight closed system including said shaft and also including said drum when closed at said opening by said cover, means for withdrawing air from said system to set up a relative vacuum therein, means in said system for operating at a point external to the drum interior for collecting and condensing the volatiles of and vapor in a batch of coffee beans being roasted and for then draining the condensate back into the drum following completion of roasting to be reabsorbed by the roasted coffee beans, said collecting and draining means comprising a substantially horizontally extending rotatively supported conduit portion in said system, a condenser normally dependent from and in continuously open communication with said rotatively supported conduit portion, a receiver normally dependent from and in continuously open communication with said condenser, and a conduit portion extending directly between the receiver and said rotatively supported conduit portion at a point between said condenser and said means for withdrawing air from the system, so constructed and arranged that said rotatively supported conduit portion, said condenser and said receiver may as a unitary structure be rotated through 180° relative to the remainder of said system to dispose the receiver above the condenser and the condenser above said conduit portion for drain back of the condensate into said drum.

2. A smokeless coffee roasting unit, comprising a roasting drum rotatively mounted having a coffee beans admission and discharge opening, a cover for closing said opening, said mounting means including a hollow shaft the interior of which opens into the interior of said drum, an air-tight closed system including said shaft and also including said drum when closed at said opening by said cover, means for withdrawing air from said system to set up a relative vacuum therein, and means also included in said system for operating at a point external to the drum interior for condensing the volatiles of and vapor in a batch of coffee beans in said drum driven off from said beans by the roasting heat, for collecting said condensate and for subsequent redisposition to drain back said condensate into said drum, the means last-named including a substantially horizontally extending conduit portion of said system, a rotary joint means in said conduit section, a condenser normally dependent from and in continuously open communication with said rotary joint means, and a receiver normally dependent from and in continuously open communication with said condenser, said rotary joint means including a pair of rotary joints at opposite ends of said substantially horizontally extending conduit portion, each of said rotary joints incorporating a pair of like oppositely arranged end nipples each having at one end a ground-finish substantially hemispherical seat, a main part the substantially central portion of which is spherical at opposite sides of said main part for air-tight fit of said central portion in said seat, and means for coupling said nipples and said main part to hold the said substantially central portion of said main part in said seat while permitting rotation of said central part relative to said nipples, there being a passageway through said substantially central portion of said main part for being always and by way of said nipples a subdivision of the interior of said closed system.

3. A smokeless coffee roasting unit, comprising a roasting drum rotatively mounted having a coffee beans admission and discharge opening, a cover for closing said opening, said mounting means including a hollow shaft the interior of which opens into the interior of said drum, an air-tight closed system including said shaft and also including said drum when closed at said opening by said cover, means for withdrawing air from said system to set up a relative vacuum therein, and means also included in said system for operating at a point external to the drum interior for condensing the volatiles of and vapor in a batch of coffee beans in said drum driven off from said beans by the roasting heat, for collecting said condensate and for subsequent redisposition to drain back said condensate into said drum, the means last-named including a substantially horizontally extending conduit portion of said system, a rotary joint means in said conduit section, a condenser normally dependent from and in continuously open communication with said rotary joint means, and a receiver normally dependent from and in continuously open communication with said condenser, said rotary joint means including a pair of rotary joints at opposite ends of said substantially horizontally extending conduit portion, each of said rotary joints incorporating a pair of like oppositely arranged end nipples each having at one end a ground-finish substantially hemispherical seat, a main part the substantially central portion of which is spherical at opposite sides of said main part for air-tight fit of said central portion in said seat, and means for coupling said nipples and said main part to hold the said substantially central portion of said main part in said seat while permitting rotation of said central part relative to said nipples, there being a passageway through said substantially central portion of said main part for being always and by way of said nipples a subdivision of the interior of said closed system, said coupling means including a pair of clamp nuts, there being a pair of ball-bearings for permitting said clamp nuts to be tightened up relative to said nipples and said main part in a way to avoid clamping said central part against rotation relative to said nipples.

4. A smokeless coffee roasting unit, comprising a roasting drum rotatively mounted having a coffee beans admission and discharge opening, a cover for closing said opening, said mounting means including a hollow shaft the interior of which opens into the interior of said drum, an air-tight closed system including said shaft and also including said drum when closed at said opening by said cover, means for withdrawing air from said system to set up a relative vacuum therein, and means also included in said system for operating at a point external to the drum interior for condensing the volatiles of and vapor in a batch of coffee beans in said drum driven off from said beams by the roasting heat, for collecting said condensate and for subsequent redisposition to drain back said condensate into said drum, the means last-named including a substantially horizontally extending conduit portion of said system, a rotary joint means in said conduit section, a condenser normally dependent from and in continuously open communication with said rotary joint means, and a receiver normally dependent from and in continuously open communication with said condenser, said rotary joint means including a pair of rotary joints at opposite ends of said substantially horizontally extending conduit portion, each of said rotary joints incorporating a pair of like oppositely arranged end nipples each having at one end a ground-finish substantially hemispherical seat, a main part the substantially central portion of which is spherical at opposite sides of said main part for air-tight fit of said central portion in said seat, and means for coupling said nipples and said main part to hold the said substantially central portion of said main part in said seat while permitting rotation of said central part relative to said nipples, there being a passageway through said substantially central portion of said main part for being always and by way of said nipples a subdivision of the interior of said closed system, said coupling means including a pair of clamp nuts, there being a pair of ball-bearings for permitting said clamp nuts to be tightened up relative to said nipples and said main part in a way to avoid clamping said central part against rotation relative to said nipples, the passageway through said substantially central portion of said main part being substantially T-shaped to include a branch-off conduit connection to said condenser.

EMIL CHALUPA.

REFERENCES CITED

The following references are of record in the file of this patent:

UNITED STATES PATENTS

| Number | Name | Date |
| --- | --- | --- |
| 83,889 | Taylor | Nov. 10, 1868 |
| 119,959 | Ashcroft | Oct. 17, 1871 |
| 339,114 | Rundel | Mar. 30, 1886 |
| 493,606 | Trillich | Mar. 14, 1893 |
| 764,226 | Cottrell | July 5, 1904 |
| 2,283,319 | Dienst | May 19, 1942 |

FOREIGN PATENTS

| Number | Country | Date |
| --- | --- | --- |
| 15,848 | Great Britain | Sept. 3, 1892 |
| 82,430 | Switzerland | Feb. 16, 1920 |